(12) United States Patent
Rötzer

(10) Patent No.: US 10,948,164 B2
(45) Date of Patent: Mar. 16, 2021

(54) LIGHT SYSTEM WITH A SINGLE ONE-PART LENS

(71) Applicant: Motherson Innovations Company Limited, London (GB)

(72) Inventor: Ilka Rötzer, Denkendorf (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/431,868

(22) Filed: Jun. 5, 2019

(65) Prior Publication Data

US 2019/0368689 A1 Dec. 5, 2019

(30) Foreign Application Priority Data

Jun. 5, 2018 (DE) ..................... 10 2018 113 370.7

(51) Int. Cl.
| | |
|---|---|
| *G03B 21/20* | (2006.01) |
| *F21V 13/10* | (2006.01) |
| *F21V 5/04* | (2006.01) |
| *B60Q 1/26* | (2006.01) |
| *G03B 21/14* | (2006.01) |

(52) U.S. Cl.
CPC ........... *F21V 13/10* (2013.01); *B60Q 1/2665* (2013.01); *F21V 5/04* (2013.01); *G03B 21/142* (2013.01); *G03B 21/208* (2013.01); *B60Q 2400/50* (2013.01)

(58) Field of Classification Search
CPC .. G03B 21/142; G03B 21/145; G03B 21/208; G03B 21/2013; G03B 21/2033; G03B 21/2053; G02B 27/0916; G02B 27/0933; G02B 27/0955; G02B 27/0988
See application file for complete search history.

(56) References Cited

U.S. PATENT DOCUMENTS

| 2008/0302947 A1* | 12/2008 | Utagawa ................ G02B 7/32 250/201.8 |
| 2013/0148363 A1* | 6/2013 | Choquet .................. F21V 5/04 362/311.02 |

(Continued)

FOREIGN PATENT DOCUMENTS

| CN | 202382141 U | 8/2012 |
| DE | 102011014113 A1 | 9/2012 |
| JP | 2016-134314 A | 7/1916 |

OTHER PUBLICATIONS

German Office Action dated May 16, 2019 of German application DE 10 2018 113 370.7.

*Primary Examiner* — Sultan Chowdhury
(74) *Attorney, Agent, or Firm* — Jones Day

(57) ABSTRACT

A light system includes a light source for emitting divergent light, and only one imaging lens arranged in front of the light source in the divergent light for imaging the divergent light directly received from the light source, where the imaging lens is one-piece fabricated part and comprises a first lens section with a non-structured and convex light entry surface curved in a direction of the light source for the entry of the divergent light of the light source into the imaging lens, a second lens section with a convex light exiting surface curved in a light propagation direction for imaging the light entered, and a mask arranged between the first and second lens sections for modifying the light entered into the first lens section before leaving the light exiting surface.

16 Claims, 3 Drawing Sheets

(56) References Cited

U.S. PATENT DOCUMENTS

| | | | |
|---|---|---|---|
| 2014/0146553 A1* | 5/2014 | Hering | F21S 41/155 |
| | | | 362/509 |
| 2014/0268180 A1* | 9/2014 | Takaura | G03G 15/00 |
| | | | 356/624 |
| 2016/0290583 A1* | 10/2016 | Suwa | F21S 41/43 |
| 2017/0023789 A1* | 1/2017 | Nakamura | B60K 35/00 |
| 2018/0067385 A1* | 3/2018 | Nakada | G03B 21/208 |

* cited by examiner

LIGHT SYSTEM WITH A SINGLE ONE-PART LENS

CROSS-REFERENCE TO RELATED APPLICATION

This application claims the benefit of foreign priority to German Patent Application No. DE 10 2018 113 370.7, filed Jun. 5, 2019, which is hereby incorporated by reference in its entirety for all purposes.

BACKGROUND

1. Field of the Invention

The present disclosure is generally related to a light system which includes two optical components (light source and imaging lens), a motor vehicle equipped with such a light system and a method for manufacturing this light system.

2. Related Art

There are currently several built-in light systems in vehicles. In addition to a light source, these usually have three or more optical components with different optical functions, for example as a collecting lens, as an element for structuring the light and as a dispersing lens for light systems for imaging patterns on backgrounds. Such multi-component systems require a relatively large installation depth and thus stand in the way of the most compact possible construction of light systems. In addition, an increased number of components requires careful adjustment of the components to each other, which makes such a system less robust against impacts, etc., and thus can negatively change the imaging properties over time. The increased number of components makes the system more complex and therefore more expensive to manufacture and handle.

A lighting device of a motor vehicle which has at least one transparent optical system produced by a multi-layer injection molding process through which light beams pass when the lighting device is switched on is known from DE 10 2011 014 113 A1. The lighting device may be in the form of a motor vehicle headlamp and the headlamp may include a projection module including at least one light source for emitting light, at least one primary optic for focusing the emitted light and at least one projection lens for imaging the focused light on a road in front of the vehicle to produce a desired light distribution.

The CN 202 382 141 U relates to a vehicle projection lamp including a lamp housing, a light source module, a transparent surface mask and a partially transparent graphic membrane, the transparent surface mask being arranged on the lamp housing so as to provide an interior space between the lamp housing and the transparent surface mask. The light source module is located in the interior; and the partially transparent graphic membrane is located in the interior between the light source module and the transparent surface mask. Optimally, the light source module is provided with an LED light source and also has a lens amplifier arrangement disposed in the interior; wherein the partially transparent graphic membrane is disposed between the light source module and the lens amplifier assembly, in the lens amplifier assembly, or between the lens amplifier assembly and the transparent surface mask. The lens gain assembly may include a first projection lens, a second projection lens, and a collecting lens, the collecting lens being adjacent to the light source module and the partially transparent graphic membrane being arranged between the second projection lens and the collecting lens.

Also known from JP 2016 134 314 A is a projection device for a vehicle in which an LED emits light and the light is transmitted through a collimator lens 52, a pattern film 62, a first focusing lens 54 and a second focusing lens 58 so that a pattern of the pattern film is projected. By releasing a mounting projection of an upper portion from a mounting plate of a lower portion in a housing, the housing can be divided into the upper portion and the lower portion. In this way, the inside of a housing body can be exposed and modified.

It would therefore be desirable to have a compact, robust light system for imaging patterns that can be manufactured with little effort and yet has good imaging properties.

SUMMARY

In one aspect, a light source is provided for emitting divergent light and only one imaging lens arranged in front of it in the divergent light for imaging the divergent light directly received from the light source, wherein the imaging lens is one-part fabricated and a first lens section with a non-structured and convex light entry surface curved in the direction of the light source for the entry of the divergent light of the light source into the imaging lens, a second lens section with convex a light exiting surface curved in the light propagation direction for imaging the light entered, and a mask arranged between the first and second lens sections for modifying the light entered into the first lens section before to exiting the light exiting surface.

Light directly received designates an arrangement in which no other optical elements such as additional lenses, collimators, mirrors, etc. are arranged between the light source and the imaging lens. The light propagation direction designates the mean direction of the light emitted by the light source. In this direction, the intensity of the light emitted before entering the imaging lens is also maximal. The light source can, for example, be an LED, a laser diode or a light exiting surface shaped to emit divergent light, which is arranged, for example, on a fibre optic into which light from another light source is fed.

The term "non-structured" designates surfaces that are homogeneous and smooth. These surfaces can, however, have a contour as homogeneous and smooth surfaces, such as a convex contour, i.e. a curvature directed outwards. In contrast, a structured surface would be, for example, an arrangement of an array of connected microlenses that does not have a non-structured surface.

The convex light entry surface of the first lens section can have any suitable shape, for example a spherical, aspherical, parabolic shape. It serves as a collecting lens for collecting the divergent light of the light source in the imaging lens. The convex second lens section serves as a diffuser for imaging the mask onto a suitable substrate beyond the light system The feature of the one-part imaging lens designates at least after its manufacture a firmly connected arrangement of first lens section, second lens section and mask without interspaces in the direction of light propagation between the individual components. Suitable materials for the lens sections are, for example, diverse glasses or plastics. The material of the mask can be any material that can be structured and develops an optical effect (opaque, semitransparent). The mask can be a self-supporting component inserted into the imaging lens, or a thin coating of such a material inserted into the imaging lens during the manufacturing process. For example, the mask may be made of a metal, metal alloy or a plastic material. The mask has a shape and structure adapted to the application to provide the desired projection through the mask. The mask can include a logo, symbol, graphic sign, pattern or lettering that can be projected onto a substrate via the imaging lens. With the second lens section as the dispersing lens, the light is dispersed uniformly and homogeneously and is thus projected onto the respective substrate without edges and without defects visible for the human eye.

The mask can be inserted as a coherent component into the imaging lens during the manufacturing process or can be printed, vapour-deposited, pressed in, glued in, coated with thin-film processes and, if necessary, structured using suitable techniques for manufacturing the desired mask structure on the first or second lens section at a suitable position during the manufacturing process if the first and second lens sections are fabricated separately before they are connected together to form a one-part imaging lens, and, where appropriate, structured using appropriate techniques to produce the desired mask structure and mask shape (e.g. by coating through a mask, laser structuring, or etching).

The light system thus includes exactly two optical components between the light source and the imaging element, specifically the light source and the imaging lens, in order to be able to image the mask onto a substrate. This arrangement represents a maximally compact system and therefore requires much less installation space than conventional systems consisting of four or more optical elements between light source and imaging element. Due to the one-part form, the optical components can no longer slip against each other and are therefore very robust against impacts and other treatments. As a result, the light system has a consistent image quality throughout its lifetime.

The light system according to the invention thus provides a compact, robust, that can be manufacturable with little effort and yet good imaging properties light system for imaging patterns.

In one example, the light source has a light exiting surface which is smaller by at least a factor of 5, preferably by at least a factor of 10, than a maximum area of the imaging lens perpendicular to the light propagation direction. Thus the light source represents a point light source relative to the imaging lens in approximation, whose light beam can be formed as desired with corresponding lenses, without causing too large imaging errors.

In a further example, a distance between the light source and the imaging lens and the maximum area of the imaging lens are selected so that the light source fully illuminates the light entry surface of the first lens section of the imaging lens. This means that the full area of the imaging lens is used to collect light, which is then modified by the mask, allowing the mask to be imaged over a large area by the second lens section.

In a further example, the mask has a structuring perpendicular to the light propagation direction including one or more first non-transparent areas and/or one or more transparent second areas and/or one or more semi-transparent third areas. Non-transparent areas prevent light from entering the second lens section. Transparent areas allow the light to enter the second lens section unchanged. Semi-transparent areas modify the light, for example in its intensity and/or colour.

In a further example, the light entry surface of the first lens section is shaped in such, that the light, after entering the imaging lens, reaches the mask parallel to the light propagation direction. This allows the pattern of the mask to be better illuminated and thus imaged.

In a further example, the light exiting surface, preferably with a spherical, aspherical or free shape, of the second lens section is shaped as a dispersing lens. A dispersing lens (or diffuser lens) has the function of dispersing the light modified by the mask uniformly and homogeneously from the imaging lens. Thus an image of the mask can be projected on a suitable substrate, for example on a floor without edges and without defects visible for the human eye.

In another example, the light exiting surface of the second lens section can also be equipped with light exiting channels in order to further modify the beam shape of the light.

In a further example, the mask has a flat shape and is arranged in a cavity between the first and second lens sections. A flat shape has parallel surfaces perpendicular to the light propagation direction and a small thickness in the light propagation direction relative to the diameter or length of these surfaces. A flat mask has the most favorable projection properties in a parallel light beam.

In a further example, the cavity is created by a recess in a light exiting surface of the first lens section facing the second lens section and/or by a recess in a light entry surface of the second lens section facing the first lens section. On the one hand, the position of the mask is clearly defined and, on the other hand, the mask can be easily and accurately inserted on or into the respective semi-finished product (first or second lens section for further processing). Preferably, the light exiting surface of the first lens section and the light entry surface of the second lens section are planar and parallel surfaces so that both lens sections can be well assembled to produce a one-part imaging lens.

In a further example, the cavity is connected via a slit to the surroundings of the imaging lens, so that the mask for the manufacturing of the one-part imaging lens can be inserted into the cavity after the manufacturing the interconnected first and second lens sections. Subsequent insertion of the mask simplifies the manufacturing process and allows flexibility in the mounting of the desired masks on the unfinished imaging lenses.

In a further example, the first and second lens sections are fabricated of different materials. Thus, the two lens sections and the effect caused by them can be variably and specifically adapted to the respective desired imaging properties and, where appropriate, the suitable materials can be selected for the respective local temperature conditions in the light system. Suitable materials for the lens sections are, for example, various glasses or plastic materials.

In another aspect, a motor vehicle includes a light system as a projection device. The projection device can, for example, project the pattern of the mask onto a ground such as a street surface or a road surface adjacent to the motor vehicle as a projection surface. In one embodiment, the projection device is arranged in or on a rear-view device, preferably an exterior mirror and/or a camera mount of the motor vehicle. However, it is not absolutely necessary to attach the projection device to a rear-view device; alternatively, it can also be mounted/arranged freely on one side of a motor vehicle.

In another aspect, a method for manufacturing a light system including a light source for emitting divergent light and only one imaging lens arranged in front of it in the divergent light for imaging the divergent light directly received from the light source, includes the following steps:

Fabricating a first lens section with a non-structured and convex light entry surface curved in the direction of the light source for the entry of divergent light of the light source into the first lens section and a suitably shaped opposite light exiting surface;

Fabricating a second lens section with a convex light exiting surface curved in the light propagation direction to image the light entered and an opposite light entry surface;

assembling first and second lens sections and a mask for modifying the light entered the first lens section into a one-part imaging lens; and Arranging of the one-part imaging lens in front of the light source for directly receiving the divergent light of the light source.

The assembling can be carried out with any suitable technique, for example by gluing, welding or a two-component injection molding technique. The first and second lens sections and the mask embedded in them form a closed system into which no dirt or moisture can penetrate and which therefore has a long lifetime with constant imaging properties. The light source, for example an LED, can be arranged on a printed circuit board (PCB) which is inserted into a housing of the light system. The one-part imaging lens is then inserted into the housing at the intended distance and connected to the housing to operate the light system as a projection device.

With the method, a compact, robust light system according to the invention can be manufactured with little effort, which nevertheless has good imaging properties.

In one example of the method, the first and second lens sections are produced by injection molding. Injection molding is a cost-effective manufacturing technique that can quickly and reliably produce the desired shapes using molding tools. Plastic materials are suitable materials for injection molding.

In a further example of the method using injection molding techniques, the fabricating the first and second lens sections and the assembling include the following steps:

Equipping a first mold half of an injection molding tool with a slider to create a material-free volume as a later cavity;

Injecting of the first lens section by means of the first mold half in the presence of the slider;

Attaching a second mold half to the injection molding tool;

Injecting of the second lens section to the light exiting surface of the first lens section by means of the second mold half;

removing first and second mold halves and the slider for defining a slit between light exiting surface of the first lens section and light entry surface of the second lens section in the one-part interconnected first and second lens sections; and Inserting the mask into the slit between the first and second lens sections as the assembling of the one-part imaging lens.

The above method is a so-called two-component injection molding method with which the desired one-part imaging lens can be produced fast and inexpensively. The mask can be glued, pressed in, clipped in or clamped in an analogous way to a modular system, so that it is securely and precisely fixed between the lens sections. The slider made of any material secures the cavity for the mask, as the volume it occupies cannot be taken up by the injected material. The second half of the mold is brought to the component and the mold rotates with the sprue so that the second half of the lens can be injected onto it.

In a further example of the method, this further includes closing the slit with suitable material, preferably the material of the first or second lens section. By the closing the mask remains stationary in the imaging lens and cannot slip by handling, as for example on a transport or in use. This completely eliminates the possibility of dirt or moisture penetrating through the slit between the mask and the remaining components.

In a further example of the method, the assembling includes applying the mask to the light exiting surface of the first lens section or to the light entry surface of the second lens section prior to the one-part interconnection of the first and second lens sections together. For example, the first lens section can be injected and then a dark coating applied to the light exiting surface, a previously applied coating mask leaving the surfaces through which the light is to be projected free. After application, the coating mask is removed and the second lens surface is injected as described above. Alternatively, a dark coating can be applied to the light exiting surface of the first lens section and the areas through which light is to pass for projection can be etched off. Alternatively, the desired mask shape could also be printed or applied as a thin coating using a mask coating method. Preferably the mask and its contact surfaces have a flat (planar) shape or surface.

The above listed examples may be used individually or in any combination to create the device and method according to the invention.

BRIEF DESCRIPTION OF THE FIGURES

These and other aspects of the invention are shown in detail in the following figures.

DETAILED DESCRIPTION

Figure 1:
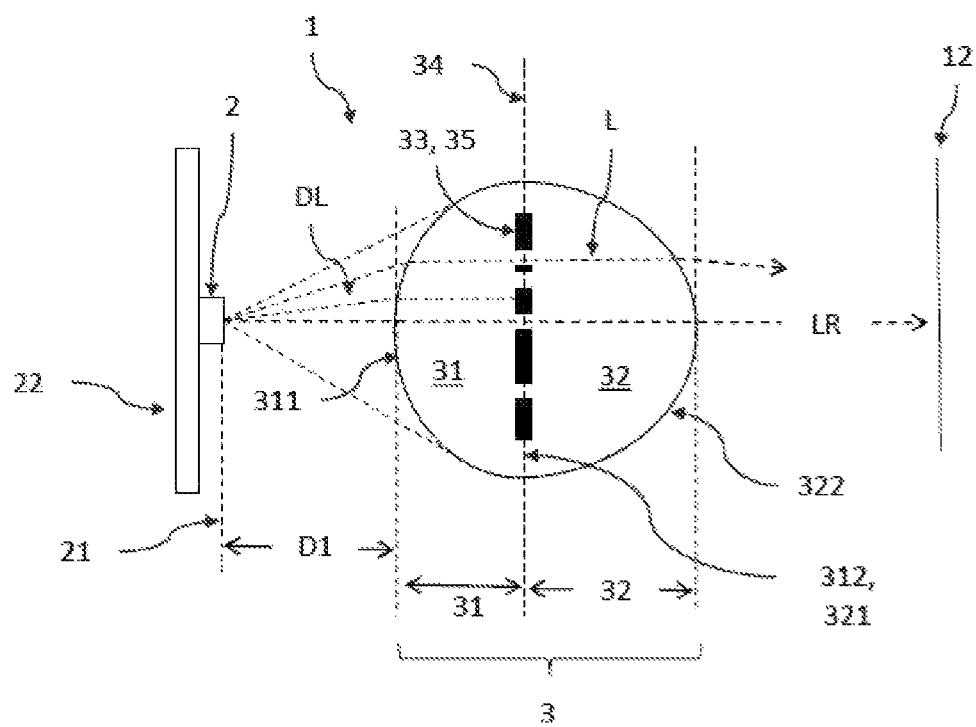
FIG. 1 is a schematic representation of a lateral view of an example of the light system.

FIG. 1 is a schematic representation of a lateral view of an example of the light system. The light system 1 includes a light source 2 for emitting divergent light DL and only one imaging lens 3 arranged in front of it in the divergent light DL for imaging the divergent light DL directly received from the light source 2. No further optical components are arranged between the light source 2 and the imaging lens 3 in the light beam. Seen in light propagation direction LR, no further optical components are arranged here up to the projection surface 12, on which the pattern of a mask 33 is projected. Any transparent covers in the light path behind the imaging lens 3 to protect the light system 2 are not regarded as optical components because they do not significantly change the shape, intensity or color of the light.

The light source 2 has a light exiting surface 21 which is significantly smaller than a maximum surface 34 of the imaging lens 3 perpendicular to the light propagation direction LR. Thus the imaging lens is illuminated relatively seen by an almost point-shaped light source. The differences in size are preferably at least a factor of 5, more preferably at least a factor of 10. The distance D1 between light source 2 and imaging lens 3 and the maximum area 34 of the imaging lens 3 are selected such that the light source 2 fully illuminates the light entry surface 311 of a first lens section 31 of the imaging lens 3 so that large-area masks 33 can be illuminated and projected over their entire surface. The imaging lens 3 is one-part fabricated and its first lens section 31 is formed with the non-structured and convex light entry surface 311 curved in the direction of the light source 2 for the entry of the divergent light DL of the light source 2 into the imaging lens 3. The first lens section 31 thus functions as a collecting lens for the divergent light DL. The light entry surface 311 of the first lens section 31 is shaped in such, that the light, after entering the imaging lens 3 reaches the mask 33 parallel to the light propagation direction LR. In the light propagation direction LR behind it, in contact with the first lens section 31, a second lens section 32 with a convex light exiting surface 322 curved in the light propagation direction LR is arranged to image the light L entering via the light entry surface 311 of the first lens section 31. The light exiting surface 322 of the second lens section 32 is shaped as a dispersing lens, preferably with a spherical, aspherical or suitable free shape.

The first and second lens sections 31, 32 can be made of all suitable materials. In one embodiment, the first and second lens sections 31, 32 are fabricated of different materials in order to suitably determine the imaging properties not only by the shape of the lens sections 31, 32 but also by the material properties.

Between both lens sections 31, 32 the mask 33 is arranged for the modification of the light L entering the first lens section 31 before leaving the light exiting surface 322. Mask 33 can have a different shape and structure for the desired projections, adapted to the respective application. The mask 33 in this embodiment has a flat shape and is arranged in a cavity 35 (see FIG. 2) between the first and second lens sections 31 and 32.

Figures 2A, 2B:
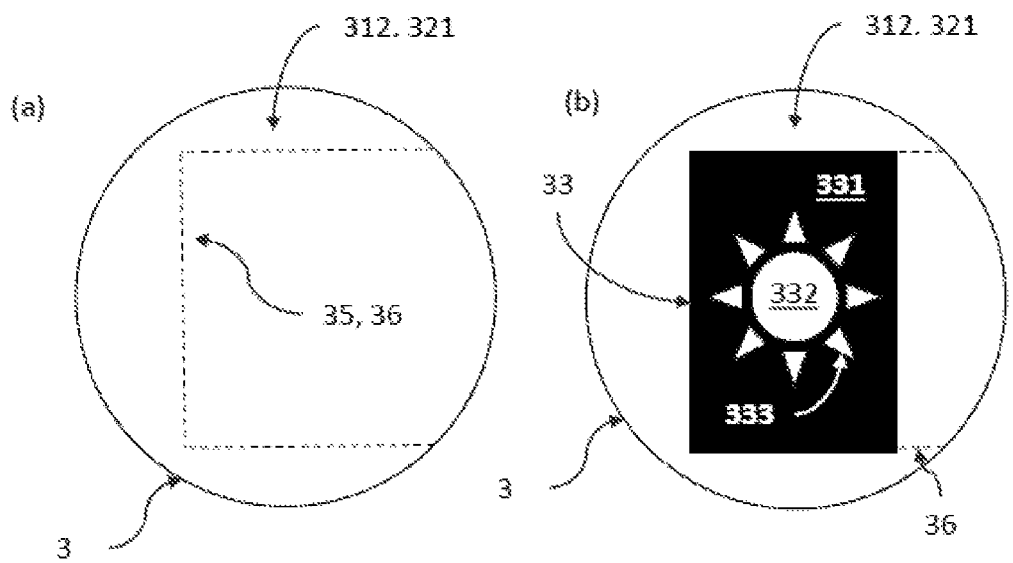
FIGS. 2A and 2B are schematic representations of a sectional view of an example of the imaging lens perpendicular to the direction of light propagation (a) without a mask and (b) with a mask.

FIGS. 2A and 2B are schematic representations of a sectional view of an example of the imaging lens perpendicular to the direction of light propagation (a) without a mask and (b) with a mask. In order for the mask 33 to be able to project a desired pattern, it has a structuring perpendicular to the light propagation direction LR, which in this embodiment is intended to represent a sun. First non-transparent areas 331 limit the projection to the desired pattern, transparent second areas 332 form the pattern in the projection and semi-transparent third areas 333 can modify the impression of the pattern by projecting less bright areas 333 or differently colored areas 333 in addition to the transparent areas 332. Preferably the mask 33 has a flat shape and is arranged in a cavity 35 between the first and second lens sections 31, 32.

The cavity 35 may be created by a recess in a light exiting surface 312 of the first lens section 31 facing the second lens section 32 and/or by a recess in a light entry surface 321 of the second lens section 32 facing the first lens section 31. Further, the cavity 35 may be connected to the surroundings of the imaging lens 3 via a slit 36 (as shown in FIG. 2a without a mask for better visualization), so that the mask 33 may be inserted into the cavity 35 for manufacturing the one-part imaging lens 3 after manufacturing the interconnected first and second lens sections 31, 32. The state with mask 33 in cavity 35 is shown in FIG. 2b. After inserting mask 33 into cavity 35, slit 36 can be closed with suitable materials by inserting or injecting these materials and, if necessary, hardening of the same into slit 36.

Figure 3:
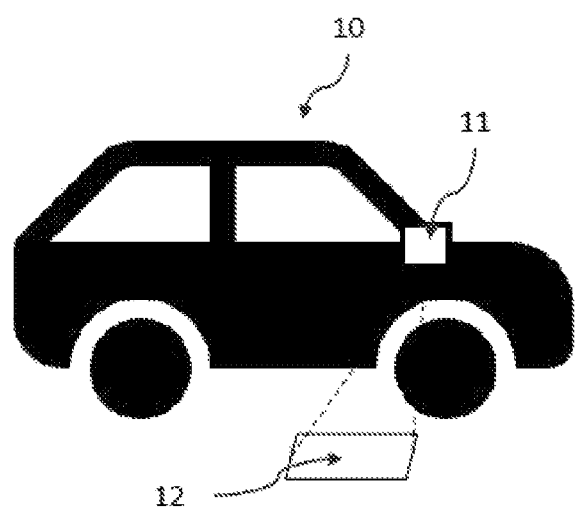
FIG. 3 is a schematic representation of an example of a motor vehicle with a light system as a projection device.

FIG. 3 shows a schematic representation of a motor vehicle 10 according to the invention with a light system 1 according to the invention as a projection device 11. The projection device 11 may, for example, be arranged in or on a rear-view device which is formed, for example, as a camera mount of the motor vehicle 1 or as shown here as an exterior mirror.

Figure 4:
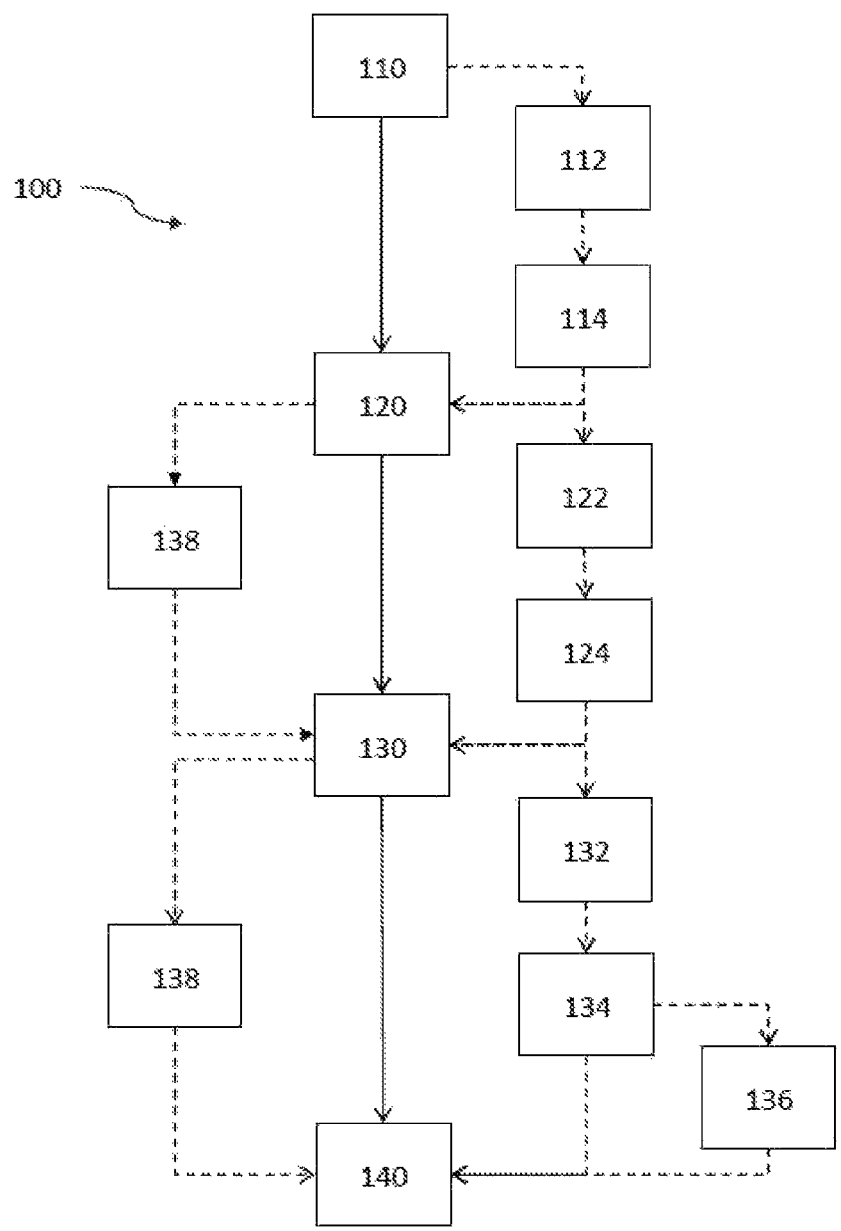
FIG. 4 is a flowchart illustrating an example of a method for manufacturing of the light system.

FIG. 4 shows an embodiment of the method 100 according to the invention for manufacturing the light system 1 according to the invention, including a light source 2 for emitting divergent light DL and only one imaging lens 3 arranged in front of it in the divergent light DL for imaging the divergent light DL directly received from the light source 2. Method 100 then includes the following steps:

Fabricating 110 a first lens section 31 with a non-structured and convex light entry surface 311 curved in the direction of the light source 2 for the entry of the divergent light DL of the light source 2 into the first lens section 31 and a suitably shaped opposite light exiting surface 312.

Fabricating 120 of a second lens section 32 with a convex light exiting surface 322 curved in the light propagation direction LR to image the light entered L and an opposite light entry surface 321.

Assembling 130 of the first and second lens sections 31, 32 and a mask 33 for modifying the light entered L the first lens section 31 into a one-part imaging lens 3.

Arranging 140 of the one-part imaging lens 3 in front of the light source 2 for directly receiving the divergent light DL of the light source 2, without further optical components being present at least in the light path between light source 2 and imaging lens 3.

The first and second lens sections 31, 32 may be manufactured by injection molding, wherein in one embodiment the manufacturing 110, 120 of the first and second lens sections 31, 32 and the Assembling 130 include the following steps:

Equipping 112 of the first mold half of an injection molding tool with a slider to create a material-free volume as the later cavity 35.

Injecting 114 of the first lens section 31 by means of the first mold half when the slider is present.

Attaching 122 a second mold half to the injection molding tool.

Injecting 124 of the second lens section 32 onto the light exiting surface 312 of the first lens section 31 by means of the second mold half.

Removing 132 of the first and second mold halves and the slider for defining a slit 36 between light exiting surface 312 of the first lens section 31 and light entry surface 321 of the second lens section 32 in the one-part interconnected first and second lens sections 31, 32.

Inserting 134 the mask 33 into the slit between the first and second lens sections 31, 32 as assembling 130 of the one-part imaging lens 3.

In one embodiment an additional closing 136 of the slit 36 with suitable material, preferably the material of the first or second lens section, can be done.

In a variant of method 100, assembling 130 includes applying 138 the mask 33 to the light exiting surface 312 of the first lens section 31 or to the light entry surface 321 of the second lens section 32 prior to one-part interconnection of the first and second lens sections 31, 32 with each other. This step can also be performed, in one embodiment, between steps 120 and 130. Step 138 replaces steps 134 and 136.

The embodiments shown here are only examples of the present invention and must therefore not be understood as restrictive. Alternative embodiments considered by the skilled person are equally covered by the scope of protection of the present invention.

REFERENCE LIST 1 light system according to the invention
2 light source
3 imaging lens
10 motor vehicle
11 projection device
12 projection surface
21 light exiting surface
22 circuit board (e.g. PCB)
31 first lens section
32 second lens section
33 mask
34 maximum area of the imaging lens perpendicular to the light propagation direction
35 cavity between first and second lens section
36 slit
100 Method for manufacturing of a light system according to the invention, for example by injection molding
110 Fabricating of a lens section
112 Equipping a first mold half of an injection molding tool with a slider
114 Injecting the first lens section
120 Fabricating a second lens section
122 Attaching a second mold half to the injection molding tool
124 Injection of the second lens section to the light exiting surface of the first lens section
130 Assembling first and second lens sections and the mask to form a one-part imaging lens
132 Removal of first and second mold halves as well as the slider
134 Inserting the mask into the slit between the first and second lens section
136 Closing the slit with suitable material
138 Applying the mask to the light exiting surface or the light entry surface of the first or
second lens sections prior to their one-part connection to each other
140 Arrangement of the one-part imaging lens in front of the light source for directly receiving the divergent light
311 Light entry surface of the first lens section
312 Light exiting surface of the first lens section
321 Light entry surface of the second lens section
322 Light exiting surface of the second lens section
331 first area of the mask (non-transparent)
332 second area of the mask (transparent)
333 third area of mask (semi-transparent)
D1 Distance light source to imaging lens
DL divergent light
LR light propagation direction
L light entered the imaging lens

The invention claimed is:

1. A light system, comprising
a light source for emitting divergent light; and
only one imaging lens arranged in front of the light source in the divergent light for imaging the divergent light directly received from the light source,
wherein the imaging lens is one-piece fabricated part and comprises a first lens section with a convex shape having convex light entry surface curved in a direction of the light source for the entry of the divergent light of the light source into the imaging lens, a second lens section with a convex light exiting surface curved in a light propagation direction for imaging the light entered, and a mask arranged between the first and second lens sections for modifying the light entered into the first lens section before leaving the light exiting surface,
wherein the light source has a light exiting surface which is smaller by at least a factor of five than a maximum area of the imaging lens perpendicular to the light propagation direction, and
wherein a distance between the light source, the imaging lens, and the maximum area of the imaging lens are selected so that the light source fully illuminates the light entry surface of the first lens section of the imaging lens.

2. The light system according to claim 1, wherein the mask has a structure which is perpendicular to the light propagation direction comprising at least one of one or more first non-transparent areas, one or more transparent second areas, and one or more semi-transparent third areas.

3. The light system according to claim 1, wherein the light entry surface of the first lens section is shaped so that the light reaches the mask parallel to the light propagation direction after entering the imaging lens.

4. The light system according to claim 1, wherein the light exiting surface is shaped as a dispersing lens.

5. The light system according to claim 1, wherein the mask has a flat shape or is arranged in a cavity between the first and second lens sections.

6. The light system according to claim 5, wherein the cavity is created by a recess in a light exiting surface of the first lens section facing the second lens section or by a recess in a light entry surface of the second lens section facing the first lens section.

7. The light system according to claim 5, wherein the cavity is connected via a slit to the surroundings of the imaging lens so that the mask for manufacturing the one-part imaging lens can be inserted into the cavity after manufacturing the interconnected first and second lens sections, the slit being sealable or closable.

8. The light system according to claim 1, wherein the first and second lens sections are made from different materials.

9. A motor vehicle comprising at least one light system according to claim 1 acting as a projection device.

10. A method for manufacturing a light system, the method comprising:
providing the light system, comprising
a light source for emitting divergent light; and
only one imaging lens arranged in front of the light source in the divergent light for imaging the divergent light directly received from the light source,
wherein the imaging lens is one-piece fabricated part and comprises a first lens section with a convex shape having convex light entry surface curved in a direction of the light source for the entry of the divergent light of the light source into the imaging lens, a second lens section with a convex light exiting surface curved in a light propagation direction for imaging the light entered, and a mask arranged between the first and second lens sections for modifying the light entered into the first lens section before leaving the light exiting surface;
fabricating a first lens section with the convex shape having convex light entry surface curved in the direction of the light source for the entry of the divergent light (DL) of the light source into the first lens section and a suitably shaped opposite light exiting surface;

fabricating a second lens section with a convex light exiting surface curved in the light propagation direction to image the light entered and an opposite light entry surface;

assembling the first and second lens sections and the mask for modifying the light entered the first lens section into a one-part imaging lens; and arranging the one-part imaging lens in front of the light source for directly receiving the divergent light of the light source, wherein the first and second lens sections are manufactured by injection molding, and wherein the fabricating of the first and second lens sections and the assembling comprises:

equipping the first mold half of an injection molding tool with a slider to create a material-free volume as the later cavity;

injecting of the first lens section using the first mold half in the presence of the slider;

attaching a second mold half to the injection molding tool;

injecting of the second lens section onto the light exiting surface of the first lens section using the second mold half;

removing of the first and second mold halves and the slider for defining a list between light exiting surface of the first lens section and light entry surface of the second lens section in the one-part interconnected first and second lens sections; and inserting the mask into the slit between the first and second lens sections as assembling of the one-part imaging lens.

11. The method according to claim 10, further comprising closing the slit with the material of the first or second lens section.

12. The method according to claim 10, wherein the assembling comprises applying the mask to the light exiting surface of the first lens section or to the light entry surface of the second lens section prior to the one-part interconnection of the first and second lens sections with each other.

13. The method according to claim 10, wherein the mask is processed by being any one of printed, vapor-deposited, glued, pressed in, clipped in, or clamped.

14. A light system, comprising
a light source for emitting divergent light; and
only one imaging lens arranged in front of the light source in the divergent light for imaging the divergent light directly received from the light source,
wherein the imaging lens is one-piece fabricated part and comprises a first lens section with a convex shape having convex light entry surface curved in a direction of the light source for the entry of the divergent light of the light source into the imaging lens, a second lens section with a convex light exiting surface curved in a light propagation direction for imaging the light entered, and a mask arranged between the first and second lens sections for modifying the light entered into the first lens section before leaving the light exiting surface,
wherein the mask has a flat shape or is arranged in a cavity between the first and second lens sections, and
wherein the cavity is created by a recess in a light exiting surface of the first lens section facing the second lens section or by a recess in a light entry surface of the second lens section facing the first lens section.

15. A light system, comprising
a light source for emitting divergent light; and
only one imaging lens arranged in front of the light source in the divergent light for imaging the divergent light directly received from the light source,
wherein the imaging lens is one-piece fabricated part and comprises a first lens section with a convex shape having convex light entry surface curved in a direction of the light source for the entry of the divergent light of the light source into the imaging lens, a second lens section with a convex light exiting surface curved in a light propagation direction for imaging the light entered, and a mask arranged between the first and second lens sections for modifying the light entered into the first lens section before leaving the light exiting surface,
wherein the mask has a flat shape or is arranged in a cavity between the first and second lens sections, and
wherein the cavity is connected via a slit to the surroundings of the imaging lens so that the mask for manufacturing the one-part imaging lens can be inserted into the cavity after manufacturing the interconnected first and second lens sections, the slit being sealable or closable.

16. A method for manufacturing a light system, the method comprising:
providing the light system, comprising
a light source for emitting divergent light; and
only one imaging lens arranged in front of the light source in the divergent light for imaging the divergent light directly received from the light source,
wherein the imaging lens is one-piece fabricated part and comprises a first lens section with a convex shape having convex light entry surface curved in a direction of the light source for the entry of the divergent light of the light source into the imaging lens, a second lens section with a convex light exiting surface curved in a light propagation direction for imaging the light entered, and a mask arranged between the first and second lens sections for modifying the light entered into the first lens section before leaving the light exiting surface;
fabricating a first lens section with the convex shape having convex light entry surface curved in the direction of the light source for the entry of the divergent light (DL) of the light source into the first lens section and a suitably shaped opposite light exiting surface;
fabricating a second lens section with a convex light exiting surface curved in the light propagation direction to image the light entered and an opposite light entry surface;
assembling the first and second lens sections and the mask for modifying the light entered the first lens section into a one-part imaging lens; and
arranging the one-part imaging lens in front of the light source for directly receiving the divergent light of the light source,
wherein the assembling comprises applying the mask to the light exiting surface of the first lens section or to the light entry surface of the second lens section prior to the one-part interconnection of the first and second lens sections with each other.

* * * * *